(12) United States Patent
Papafotiou et al.

(10) Patent No.: US 8,222,845 B2
(45) Date of Patent: Jul. 17, 2012

(54) METHOD FOR OPERATING A ROTATING ELECTRIC MACHINE (75) Inventors: Georgios Papafotiou, Adliswil (CH); Franz Zurfluh, Brugg (CH)

(73) Assignee: ABB Research Ltd, Zurich (CH)

( * ) Notice: Subject to any disclaimer, the term of this patent is extended or adjusted under 35 U.S.C. 154(b) by 218 days.

(21) Appl. No.: 12/817,865

(22) Filed: Jun. 17, 2010

(65) Prior Publication Data
US 2010/0253269 A1 Oct. 7, 2010

Related U.S. Application Data (63) Continuation of application No. PCT/EP2008/065354, filed on Nov. 12, 2008.

(30) Foreign Application Priority Data

Dec. 20, 2007 (EP) ..................................... 07150189

(51) Int. Cl.
*H02P 6/14* (2006.01)
(52) U.S. Cl. ............... 318/400.26; 318/400.15; 318/479
(58) Field of Classification Search ............. 318/400.26, 318/400.15, 478, 479, 504, 636; 363/74, 363/95, 98, 109, 123, 131
See application file for complete search history.

(56) References Cited

U.S. PATENT DOCUMENTS

| 2004/0130918 | A1 | 7/2004 | Ho |
| 2005/0253165 | A1 | 11/2005 | Pace et al. |
| 2006/0125435 | A1 | 6/2006 | Geyer et al. |
| 2011/0050137 | A1* | 3/2011 | Imura et al. ............. 318/400.15 |

FOREIGN PATENT DOCUMENTS

| CN | 1829061 A | 9/2006 |
| EP | 1 670 135 A1 | 6/2006 |
| WO | WO 2004/036755 A2 | 4/2004 |

OTHER PUBLICATIONS

International Search Report dated Jan. 13, 2009.
Non-English International Preliminary Report on Patentability dated Mar. 12, 2009.
European Search Report dated Jul. 25, 2008 (with English language translation of category of cited documents).
Carlos A. Martins et al., "Switching Frequency Imposition and Ripple Reduction in DTC Drives by Using a Multilevel Converter", IEEE Transactions on Power Electronics, vol. 17, No. 2, Mar. 2002, pp. 286-297, XP-002508619.
Notification of Transmittal of Translation of the International Preliminary Report on Patentability (Forms PCT/IB/338 and PCT/IPEA/409) issued in corresponding International Application No. PCT/EP2008/065354 dated Nov. 25, 2010.

* cited by examiner

*Primary Examiner* — Karen Masih
(74) *Attorney, Agent, or Firm* — Buchanan Ingersoll & Rooney PC (57) ABSTRACT A method is disclosed for operating a rotating electric machine, wherein the rotating electric machine is connected by phases to a converter circuit having a direct-current circuit for switching at least two voltage levels, and the phases of the converter circuit are connected to the direct-current circuit according to a selected switch state combination of switch states of power semi-conductor switches of the converter circuit. Exemplary embodiments can reduce the switching frequency of the power semi-conductor switches, based on a prediction of further behavior of the overall system, and selection of an optimum switching state combination.

16 Claims, 3 Drawing Sheets

METHOD FOR OPERATING A ROTATING ELECTRIC MACHINE

RELATED APPLICATIONS

This application claims priority as a continuation application under 35 U.S.C. §120 to PCT/EP2008/065354, which was filed as an International Application on Nov. 12, 2008 designating the U.S., and which claims priority to European Application 07150189.4 filed in Europe on Dec. 20, 2007. The entire contents of these applications are hereby incorporated by reference in their entireties.

FIELD

The disclosure relates to the field of operating rotating electrical machines.

BACKGROUND INFORMATION

High-power voltage-converter circuits are used in many applications. Known converter circuits have three voltage levels and are used for operating rotating electrical machines, such as synchronous and asynchronous machines, which rotating electrical machines can have three stator windings. In a known method for operating a rotating electrical machine, the machine is connected phase-by-phase to a converter circuit such as this, which has a DC voltage circuit, for switching m voltage levels, where $m \geq 2$. The DC voltage circuit in a converter circuit for switching, for example, three voltage levels is formed by a first capacitor and by a second capacitor connected in series with the first capacitor, with the DC voltage circuit furthermore having a first main connection to the first capacitor, a second main connection to the second capacitor and a sub-connection, which is formed by the two series-connected capacitors. The converter circuit for switching three voltage levels furthermore has power semiconductor switches which are connected in a known manner.

In this context, in a three-phase converter circuit for switching three voltage levels, the phases of the converter circuit are, for example, connected to the DC voltage circuit in accordance with a selected switching state combination of switching states of the power semiconductor switches in the converter circuit. In the case of a converter circuit for switching three voltage levels, the phases of the converter circuit are accordingly connected to the first main connection, to the second main connection or to the sub-connection in accordance with a selected switching state combination of switching states of the power semiconductor switches of the converter circuit.

Figure 2:
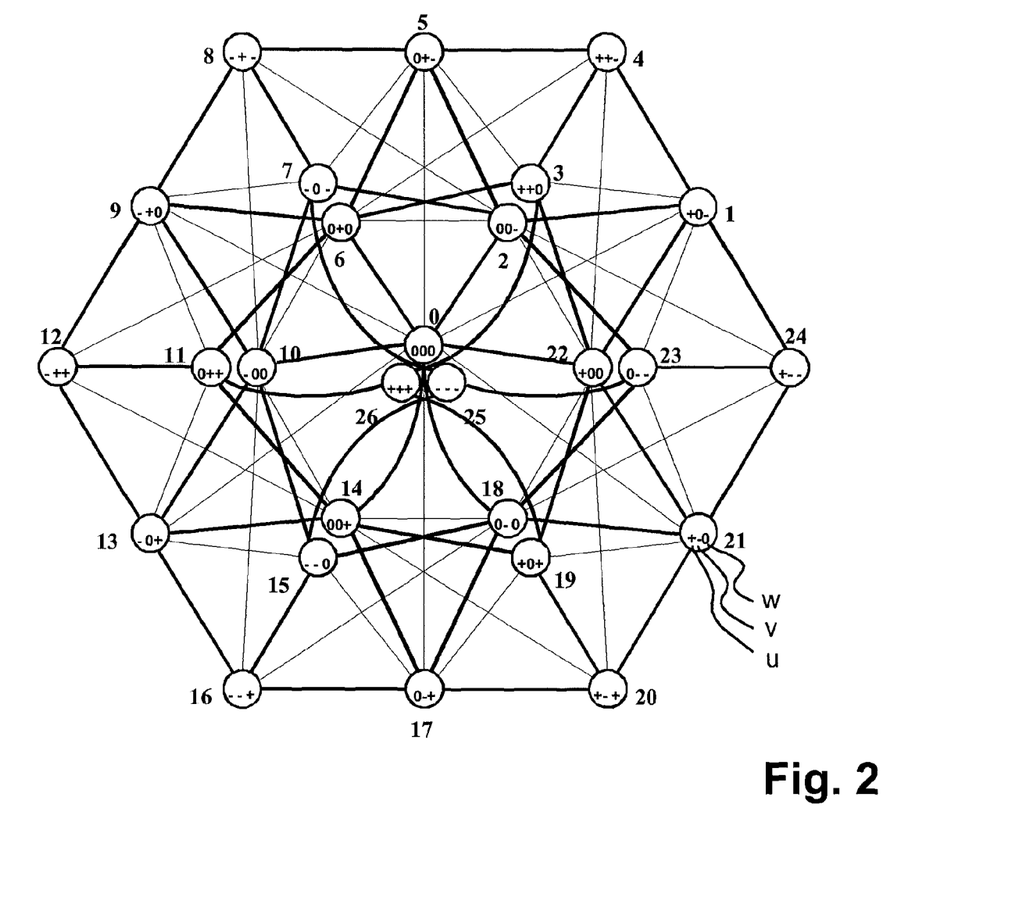
FIG. 2 shows a state diagram with switching state combinations of phases of a converter circuit.

In a state diagram, such as that shown in FIG. 2, these switching state combinations and their transitions are shown with respect to one another, with the "+" representing a connection of the corresponding phase to the first main connection, "−" representing a connection of the corresponding phase to the second main connection, and "0" representing a connection of the corresponding phase to the sub-connection.

Appropriate desired switching state combinations are selected, for example, in accordance with the known direct torque control (DTC), in which the instantaneous actual value of the torque of the rotating electrical machine, of the magnetic stator flux of the rotating electrical machine and of the potential at the sub-connection are first of all each compared with an associated, predetermined value range. The respectively predetermined value range is or can be time-variant, and can be governed by a superordinate control loop having reference values of the torque of the rotating electrical machine, of the magnetic stator flux of the rotating electrical machine and of the potential at the sub-connection. If an instantaneous actual value now exceeds its associated predetermined value range, then a switching state combination is selected from a table as a function of the previous selected switching state combination, such that the instantaneous value which results for this switching state combination could, if desired, once again be within the associated value range, although there is no guarantee of this. Furthermore, a switching state combination can be selected either with respect to the instantaneous actual value of the torque, of the magnetic stator flux or of the potential on exceeding the associated value range. There is no joint analysis of the instantaneous actual value of the torque, of the magnetic stator flux and of the potential.

In a method as described above for operating a rotating electrical machine by the known "direct torque control," there are a plurality of transitions between the previous selected switching state combination and the instantaneously selected switching state combination, and these are represented by lines between the switching state combinations in FIG. 2. The switching state combinations and the transitions from one switching state combination to another can be stored fixed in the table, although all the combination options of switching state combinations as shown in FIG. 2 need not be stored in the table. Furthermore, in the case of "direct torque control", one switching state combination can be selected as a function of the previous selected switching state combination together with the associated transitions, which is stored in the table and which once again returns the instantaneous value resulting from the selected switching state combination back within the associated value range. Switching state combinations which can alternatively be selected, for example, with possibly fewer transitions from the previous selected switching state combination, are not stored in the table. A plurality of transitions between switching state combinations generate a multiplicity of switching operations of the power semiconductor switches in the converter circuit, however, as a result of which the switching frequency of the power semiconductor switches rises. However, a high switching frequency such as this can result in heat losses (greater energy consumption) in the power semiconductor switches in the converter circuit, as a result of which the power semiconductor switches can age more quickly, may be damaged, or may even be destroyed.

In this context, EP 1 670 135 A1 specifies a method for operating a rotating electrical machine, by which the switching frequency of power semiconductor switches of a converter circuit which is connected phase-by-phase to the rotating electrical machine and which is used for switching m voltage levels can be reduced, where $m \geq 2$. According to the method, in a step (a), the phases of the converter circuit are connected to the DC voltage circuit in accordance with a selected switching state combination of switching states of power semiconductor switches in the converter circuit. This switching state combination is selected in the following further steps:

(b) starting with a start sampling time k for a selectable number N of sampling times:
 determination of all the switching state combinations relating to each of the N sampling times, wherein $N \geq 1$, (c) formation of switching state sequences for each specific switching state combination relating to the start sampling time k, wherein each switching state sequence is a sequence of specific switching state combinations of the N sampling times associated with the respective switching state combination relating to the start sampling time k, (d) for each of the switching state sequences, calculation of a torque trajectory of the rotating electrical machine and of a magnetic stator flux trajectory of the rotating electrical machine from the calculated state value sets of the rotating electrical machine and of the converter circuit for the start sampling time k to the sampling time k+N, (e) selection of a switching state sequence for which an associated torque trajectory and a magnetic stator flux trajectory relating to the (k+N)-th sampling time are each within a predetermined value range, and setting this selected switching state sequence, (f) repetition of steps (a) to (d), where k=k+1.

In the method for operating a rotating electrical machine according to EP 1 670 135 A1, method steps (b) to (e) can be carried out on a digital signal processor, in which case steps (b) to (e) are then, for example, in the form of a computer program which can be loaded. The multiplicity of calculation steps in the method according to EP 1 670 135 A1 involves computation power for a digital signal processor, thus resulting in very long computation times in the digital signal processor, and therefore also long execution times for the method steps, which can then result in the phases of the converter circuit being connected at the wrong time to the DC voltage circuit according to the selected switching state combination of switching states of the power semiconductor switches.

Furthermore, in the case of the method according to EP 1 670 135 A1, it is possible for the torque trajectory or the magnetic stator flux trajectory of each associated switching state combination relating to the k-th or to the (k+1)-th sampling time to already be outside the predetermined value range, in which case the method for operating a rotating electrical machine according to EP 1 670 135 A1 cannot handle a state such as this. However, only restricted operation of the rotating electrical machine is therefore possible.

SUMMARY

A method for operating a rotating electrical machine is disclosed, wherein the rotating electrical machine is connected phase-by-phase to a converter circuit, which has a DC voltage circuit, for switching m voltage levels, where m≧2, the method comprising:

(a) connecting phases (u, v, w) of the converter circuit to the DC voltage circuit in accordance with a selected switching state combination ($SK_{a,k}$) of switching states of power semiconductor switches in the converter circuit;

(b) starting with a start sampling time k for a selectable number N of sampling times:
determining permissible switching state combinations ($SK_k$, ... $SK_{k+N}$) relating to each of the N sampling times, wherein N≧1;

(c) forming switching state sequences (SSK) for each specific switching state combination ($SK_k$) relating to the start sampling time k, wherein each switching state sequence (SSK) is a sequence of specific switching state combinations ($SK_k$, ... $SK_{k+N}$) of the N sampling times associated with the respective switching state combination ($SK_k$) relating to the start sampling time k,
wherein the switching state combination ($SK_{a,k}$) is selected as follows:

(d) performing the determining of (b) and the forming of (c) using a field programmable gate array (FPGA);

(e1) calculating state intermediate value sets ($Y_{e,k}$, ..., $Y_{e,k+N}$) of the rotating electrical machine and the converter circuit for the start sampling time k to the sampling time k+N using a digital signal processor;

(e2) calculating state value sets ($X_{e,k}$, ..., $X_{e,k+N}$) from switching state sequences (SSK) and from the calculated state intermediate value sets ($Y_{e,k}$, ..., $Y_{e,k+N}$) using the FPGA;

(f) for each of the switching state sequences (SSK), calculating a torque trajectory (M) of the rotating electrical machine and of a magnetic stator flux trajectory ($\phi$) of the rotating electrical machine using the FPGA from the calculated state value sets ($X_{e,k}$, ..., $X_{e,k+N}$) for the start sampling time k to the sampling time k+N;

(f1) if the torque trajectory (M) relating to the k-th sampling time does not exceed a predetermined upper value range limit ($y_{M,max}$) or does not undershoot a predetermined lower value range limit ($y_{M,min}$), and if the magnetic stator flux trajectory ($\phi$) relating to the k-th sampling time does not exceed a predetermined upper value range limit ($y_{s,max}$) or does not undershoot a predetermined lower value range limit ($y_{s,min}$), selecting the switching state combination ($SK_{a,k}$) as follows in (g) to (k):

(g) selecting the switching state sequences ($SSK_a$) using the FPGA for which an associated torque trajectory (M) and a magnetic stator flux trajectory ($\phi$) relating to the (k+N)-th sampling time are each within a predetermined value range, or for which the trajectory values ($M_{T,k}$, ..., $M_{T,k+N}$) of an associated torque trajectory (M) and the trajectory values ($\phi_{T,k}$, ... $\phi_{T,k+N}$) of an associated magnetic stator flux trajectory ($\phi$) approach the respective predetermined value range with respect to the k-th sampling time to the (k+N)-th sampling time;

(h) for each of the selected switching state sequences ($SSK_a$), determining a number of times n using the FPGA until extrapolation of the trajectory values ($M_{T,k+N-1}$, $M_{T,k+N}$) of the associated torque trajectory (M) or of the trajectory values ($\phi_{T,k+N-1}$, $\phi_{T,k+N}$) of the magnetic stator flux trajectory ($\phi$) is outside the respective predetermined value range with respect to the (k+N-1)-th sampling time and the (k+N)-th sampling time;

(i) for each of the selected switching state sequences ($SSK_a$), determining a total number of switching transitions s of associated specific switching state combinations ($SK_k$, ..., $SK_{k+N}$) using the FPGA;

(j) for each of the selected switching state sequences ($SSK_a$), calculating a quality value c from a number of times n and a total number of switching transitions s using the FPGA;

(k) setting of a specific switching state combination ($SK_k$) with respect to the start sampling time k as the selected switching state combination ($SK_{a,k}$) using the FPGA, for which the quality value c of the associated selected switching state sequence ($SSK_a$) is the least;

(l) if the torque trajectory (M) relating to the k-th sampling time exceeds a predetermined upper value range limit ($y_{M,max}$) or undershoots a predetermined lower value range limit ($y_{M,min}$), calculating a torque infringement value ($v_{M,k}$, ..., $v_{M,k+N}$), which is related to the upper and lower value range limits ($y_{M,min}$, $y_{M,max}$), using the FPGA for the sampling time k to the sampling time k+N, if the magnetic stator flux trajectory ($\phi$) relating to the k-th sampling time exceeds a predetermined upper value range limit ($y_{s,min}$) or undershoots a predetermined lower value range limit ($y_{s,min}$), calculating a stator flux infringement value ($v_{s,k}$, ..., $v_{s,k+N}$), related to the upper and lower value range limits ($y_{s,min}$, ..., $y_{s,max}$), using the FPGA for the sampling time k to the sampling time k+N, and selecting the switching state combination ($SK_{a,k}$) as follows in (m) to (o):

(m) for each switching state sequence (SSK) and for the sampling time k to the sampling time k+N, determining a maximum value ($v_{max}$) from the torque infringement values ($v_{M,k}, \ldots, v_{M,k+N}$) and the stator flux infringement values ($v_{s,k}, \ldots, v_{s,k+N}$) using the FPGA;

(n) for each switching state sequence (SSK) forming a sum ($s_{vmax}$) of the maximum values ($v_{max}$) using the FPGA;

(o) setting of a specific switching state combination ($SK_k$) relating to the start sampling time k as the selected switching state combination ($SK_{a,k}$) using the FPGA for which the sum ($S_{vmax}$) of the maximum values ($v_{max}$) is the least; and (p) repeating (a) to (o), where k=k+1.

A method for operating a rotating electrical machine is disclosed, wherein the rotating electrical machine is connected to a converter circuit, which has a DC voltage circuit, the method comprising:

(a) connecting phases of the converter circuit to the DC voltage circuit in accordance with a selected switching state combination of switching states of power semiconductor switches in the converter circuit; and (b) selecting the switching state combination based on a preceding selected switching state combination, a number of transitions from the preceding selected switching state combination to the selected switching state combination, and a predetermined value range for torque of the rotating electric machine, for magnetic stator flow of the rotating electric machine, and for a potential on the partial connection.

The reference symbols used in the drawings, and their meanings, are listed in summarized form in the list of reference symbols. In principle, identical parts are provided with the same reference symbols in the figures. The described embodiments represent examples of the subject matter of the disclosure, and have no restrictive effect.

DETAILED DESCRIPTION

A method is disclosed for operating a rotating electrical machine, such that the computation time for the calculation steps of the method, and therefore the execution time for the method steps, are relatively short (e.g., as short as possible), and which method can handle switching state combinations with an associated torque trajectory and a magnetic stator flux trajectory, which torque trajectory or magnetic stator flux trajectory are outside a predetermined value range.

In an exemplary method according to the disclosure for operating a rotating electrical machine, the rotating electrical machine is connected phase-by-phase to a converter circuit, which has a DC voltage circuit, for switching m voltage levels, where m≧2. According to the method, in a step (a), the phases of the converter circuit are connected to the DC voltage circuit in accordance with a selected switching state combination of switching states of power semiconductor switches in the converter circuit.

This switching state combination can be selected in the following exemplary steps:

(b) starting with a start sampling time k for a selectable number N of sampling times:
  determination of all the permissible switching state combinations relating to each of the N sampling times, wherein N≧1, (c) formation of switching state sequences for each specific switching state combination relating to the start sampling time k, wherein each switching state sequence is a sequence of specific switching state combinations of the N sampling times associated with the respective switching state combination relating to the start sampling time k.

According to the disclosure, an exemplary switching state combination can be selected in the following steps:

(d) determination according to step (b) and formation according to step (c) by means of a field programmable gate array (FPGA), (e1) calculation of state intermediate value sets of the rotating electrical machine and of the converter circuit for the start sampling time k to the sampling time k+N by means of a digital signal processor, (e2) calculation of state value sets from switching state sequences and from the calculated state intermediate value sets by means of the FPGA, (f) for each of the switching state sequences, calculation of a torque trajectory of the rotating electrical machine and of a magnetic stator flux trajectory of the rotating electrical machine by means of the FPGA from the calculated state value sets for the start sampling time k to the sampling time k+N, (f1) if the torque trajectory (M) relating to the k-th sampling time does not exceed a predetermined upper value range limit ($Y_{M,max}$) or does not undershoot a predetermined lower value range limit ($Y_{M,min}$), and if the magnetic stator flux trajectory (φ) relating to the k-th sampling time does not exceed a predetermined upper value range limit ($Y_{S,max}$) or does not undershoot a predetermined lower value range limit ($Y_{S,min}$), selection of the switching state combination ($SK_{a,k}$) in following steps (g) to (k), (g) selection of the switching state sequences ($SSK_a$) by means of the FPGA for which an associated torque trajectory (M) and a magnetic stator flux trajectory (φ) relating to the (k+N)-th sampling time are each within a predetermined value range, or
  for which the trajectory values (MT,k, ..., MT,k+N) of an associated torque trajectory (M) and the trajectory values (φT,k, ... φT,k+N) of an associated magnetic stator flux trajectory (φ) approach the respective predetermined value range with respect to the k-th sampling time to the (k+N)-th sampling time, (h) for each of the selected switching state sequences (SSKa), determination of the number of times n by means of the FPGA until the extrapolation of the trajectory values (MT,k+N−1, MT,k+N) of the associated torque trajectory (M) or of the trajectory values (φT,k+N−1, φT,k+N) of the magnetic stator flux trajectory (φ) is outside the respective predetermined value range with respect to the (k+N−1)-th sampling time and the (k+N)-th sampling time, (i) for each of the selected switching state sequences (SSKa), determination of the total number of switching transitions s of the associated specific switching state combinations (SKk, ..., SKk+N) by means of the FPGA, (j) for each of the selected switching state sequences (SSKa), calculation of a quality value c from the number of times n and the total number of switching transitions s by means of the FPGA, (k) setting of that specific switching state combination (SKk) with respect to the start sampling time k as the selected switching state combination (SKa,k) by means of the FPGA, for which the quality value c of the associated selected switching state sequence (SSKa) is the least, (l) if the torque trajectory (M) relating to the k-th sampling time exceeds a predetermined upper value range limit (yM, max) or undershoots a predetermined lower value range limit (yM,min), calculation of a torque infringement value (vM,k, . . . , vM,k+N), which is related to the upper and lower value range limits (yM,min, yM,max), by means of the FPGA for the sampling time k to the sampling time k+N, if the magnetic stator flux trajectory (φ) relating to the k-th sampling time exceeds a predetermined upper value range limit (ys,max) or undershoots a predetermined lower value range limit (ys,min), calculation of a stator flux infringement value (vs,k, . . . , vs,k+N), related to the upper and lower value range limits (ys,min, . . . , ys,max), by means of the FPGA for the sampling time k to the sampling time k+N, selection of the switching state combination (SKa,k) in the following steps (m) to (o), (m) for each switching state sequence (SSK) and for the sampling time k to the sampling time k+N, determination of the maximum value (vmax) from the torque infringement values (vM,k, . . . , vM,k+N) and the stator flux infringement values (vs,k, . . . , vs,k+N) by means of the FPGA, (n) for each switching state sequence (SSK) formation of the sum (svmax) of the maximum values (vmax) by means of the FPGA, (o) setting of that specific switching state combination (SKk) relating to the start sampling time k as the selected switching state combination (SKa,k) by means of the FPGA for which the sum (Svmax) of the maximum values (vmax) is the least, (p) repetition of steps (a) to (o), where k=k+1.

As an exemplary alternative to steps (m) to (o), the switching state combination can also be selected according to the following steps:

(m) for each switching state sequence (SSK) and for the sampling time k to the sampling time k+N, determination of the maximum value ($v_{max}$) from the torque infringement values ($v_{M,k}$, . . . , $v_{M,k+N}$) and the stator flux infringement values ($v_{s,k}$, . . . , $v_{s,k+N}$) by means of the FPGA, (n) for each switching state sequence (SSK) formation of the sum ($S_{vmax}$) of the maximum values ($V_{max}$) by means of the FPGA, (o) setting of that specific switching state combination ($SK_K$) relating to the start sampling time k as the selected switching state combination ($SK_{ak}$) by means of the FPGA for which the sum ($S_{Vmax}$) of the maximum values ($V_{max}$) is the least.

The exemplary use of the FPGA for method steps (d), that is to say for method steps (b) and (c) and for method steps (f) to (k), can result in the digital signal processor which is used, and is used for method step (e1), being used only for the calculation steps which are desired for step (e1) of the method, as a result of which step (e1) can involve a short computation time. The state intermediate value sets which are calculated in step (e1) can therefore be available after only a very short time and can then be used further directly by the FPGA, for example in method steps (d), that is to say for method steps (b) and (c) and for method steps (e2) to (k), in which case the FPGA can likewise process these method steps in a very short time, for example, by its capability for parallel calculation of serial calculation sequences. Overall, the use of the FPGA in conjunction with the digital signal processor can make it possible to keep the computation time for the calculation steps of the method, and therefore the execution time for the method steps, short, as a result of which the connection of the phases of the converter circuit to the DC voltage circuit can take place in good time according to the selected switching state combination of switching states of the power semiconductor switches.

Steps (b) to (k) can result in the selection of the optimum switching state combination, on the basis of the previous selected switching state combination and with respect to the number of transitions from the previous selected switching state combination to the selected switching state combination, and with respect to the respective predetermined value range for the torque of the rotating electrical machine, and for the magnetic stator flux of the rotating electrical machine. This makes it possible to reduce the number of switching operations of the power semiconductor switches in the converter circuit, and therefore to reduce the switching frequency of the power semiconductor switches. The reduced switching frequency can lead to the heat losses produced in the power semiconductor switches being reduced, as a result of which the power semiconductor switches can age more slowly and can be very largely protected against damage or destruction. Furthermore, the respective value ranges can be better complied with overall.

Exemplary methods according to the disclosure therefore make it possible to predict the behavior of the rotating electrical machine over more than one sampling time cycle for specific switching state sequences, with the horizon of N sampling times after the use of steps (a) to (k) being shifted by step (p) by one sampling time cycle, and in which case only the first switching state combination (for example, the k-th switching state combination) of a switching state sequence is always selected. A quality criterion then approximates or simulates the switching frequency. Finally, in the case of exemplary methods according to the disclosure, the switching state combination can be considered jointly with respect to all relevant variables, for example the torque and the magnetic stator flux, when the associated value range is exceeded.

Steps (l) to (o) can result in the optimum switching state combination being selected in the situation in which the respectively associated torque trajectory or the magnetic stator flux trajectory is outside the predetermined value range. Exemplary methods according to the disclosure are therefore able to handle switching state combinations with a respectively associated torque trajectory and magnetic stator flux trajectory which are outside the predetermined value range. This can allow unrestricted operation of the rotating electrical machine.

Figure 1:
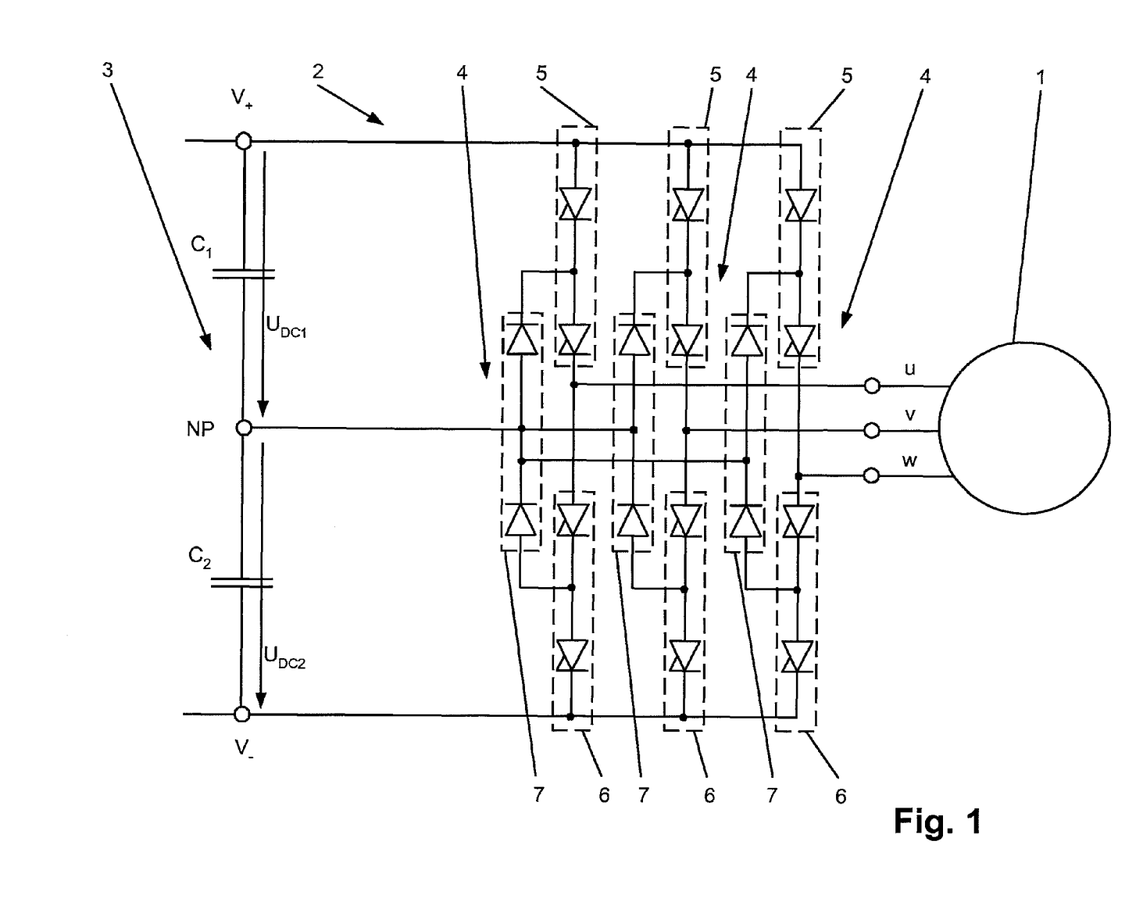
FIG. 1 shows an embodiment of a three-phase converter circuit for switching three voltage levels.

FIG. 1 shows an exemplary embodiment of a three-phase converter circuit 2 for switching three voltage levels, wherein a rotating electrical machine 1 is connected phase-by-phase to a DC voltage circuit 3 of a converter circuit 2. The rotating electrical machine 1 can be connected to a converter circuit 2 for switching m voltage levels, where, then, m≧2.

As shown in FIG. 1, the DC voltage circuit 3 is formed by a first capacitor $C_1$ and by a second capacitor $C_2$ connected in series with the first capacitor $C_1$, with the value of $C_1$ being essentially the same as that of $C_2$. The DC voltage circuit 3 according to the exemplary embodiment of a converter circuit for switching three voltage levels as shown in FIG. 1 has a first main connection $V_+$ to the first capacitor $C_1$, a second main connection $V_-$ to the second capacitor $C_2$, and a sub-connection NP, which is formed by the two series-connected capacitors $C_1$, $C_2$.

Furthermore, the converter circuit as shown in FIG. 1 has a sub-converter system 4 provided for each phase u, v, w, which sub-converter systems 4 are each formed by a first switching group 5, by a second switching group 6 and by a third switching group 7, with each switching group 5, 6, 7 being formed by two series-connected power semiconductor switches. Furthermore, in each sub-converter system 4, the first switching group 5 is connected to the first main connection $V_+$, and the second switching group 6 is connected to the second main connection $V_-$.

Furthermore, the first switching group 5 is connected in series with the second switching group 6, with the junction point in the first switching group 5 and the second switching group 6 forming a phase connection. The third switching group 7, which is in the form of a clamping switching group, is connected to the first switching group 5, for example, to the junction point between the two series-connected power semiconductor switches in the first switching group 5. Furthermore, the third switching group 7 is connected to the second switching group 6, for example, to the junction point between the two series-connected power semiconductor switches in the second switching group 6. Furthermore, the third switching group 7 is connected to the sub-connection NP, for example, the junction point between the two series-connected power semiconductor switches in the third switching group 7.

The power semiconductor switches in the first and second switching groups 5, 6 can be, as is shown in FIG. 1, in the form of controllable bidirectional power semiconductor switches, with the power semiconductor switches in the third switching group 7 being in the form of unidirectional non-controllable power semiconductor switches. However, it is also feasible for the power semiconductor switches in the third switching group 7 also to be in the form of controllable bidirectional power semiconductor switches.

According to an exemplary method, the phases u, v, w of the converter circuit 2, which is for example a converter circuit 2 for switching m voltage levels, are connected in a first step (a) to the DC voltage circuit 3 according to a selected switching state combination $SK_{a,k}$ of switching states of the power semiconductor switches of the converter circuit 2. As already mentioned initially, FIG. 2 shows, by way of example, a state diagram of switching state combinations of a converter circuit 2 for switching three voltage levels, where "+" represents a connection of the corresponding phase u, v, w to the first main connection $V_+$, "−" represents a connection of the corresponding phase u, v, w to the second main connection $V_-$, and "0" represents a connection of the corresponding phase u, v, w to the sub-connection NP, and the lines between the switching state combinations SK represent permissible transitions between the switching state combinations SK. It should be mentioned that a state diagram of switching state combinations of a converter circuit 2, for example for switching m=5 voltage levels, would be illustrated differently. For example, a person skilled in the art can implement a converter circuit in which all the possible switchable switching state combinations SK of this converter circuit can be switched without any restriction on the basis of one switching state combination SK.

The switching state combination $SK_{a,k}$ mentioned above is selected in the following exemplary steps:

In step (b), starting with a start sampling time k for a selectable number N of sampling times, all the permissible switching state combinations $SK_k, \ldots, SK_{k+N}$ relating to each of the N sampling times, for example, starting from the respectively previous determined switching state combination $SK_{k-1}$, are determined, where $N \geq 1$, and where the first previous determined switching state combination $SK_{k-1}$ is, for example, the previous selected switching state combination $SK_{a,k-1}$, that is to say relating to the sampling time k−1.

In step (c), switching state sequences SSK are formed for each specific switching state combination $SK_k$ relating to the start sampling time k, wherein each switching state sequence SSK is a sequence of specific switching state combinations $SK_k, \ldots, SK_{k+N}$ of the N sampling times associated with the respective switching state combination $SK_k$ relating to the start sampling time k. Figuratively speaking, a switching state sequence SSK such as this represents, for example, a series of possible switching state combinations $SK_k, \ldots, SK_{k+N}$ as shown in FIG. 2 along the associated line to one of the possible switching state combinations $SK_k$ relating to the start sampling time k.

According to the disclosure, the switching state combination $(SK_{a,k})$ is selected in the following exemplary steps:

In step (d) the determination according to step (b) and formation according to (c) are carried out by means of a field programmable gate array (FPGA).

In step (e1), the state intermediate value sets the rotating electrical machine 1 and of $Y_{e,k}, \ldots, Y_{e,k+N}$ of the converter circuit 2 are calculated for the start sampling time k to the sampling time k+N by means of a digital signal processor. In step (e2), state value sets $X_{e,k}, \ldots, X_{e,k+N}$ are then calculated from switching state sequences SSK and from the calculated state intermediate value sets $Y_{e,k}, \ldots, Y_{e,k+N}$ by means of the FPGA.

In step (f), a torque trajectory M of the rotating electrical machine 1 and a magnetic stator flux trajectory $\phi$ of the rotating electrical machine 1 are then calculated for each of the switching state sequences SSK from the calculated state value sets $X_{e,k}, \ldots, X_{e,k+N}$ of the rotating electrical machine and of the converter circuit for the start sampling time k to the sampling time k+N by means of the FPGA. The torque trajectory M of the rotating electrical machine 1 and the magnetic stator flux trajectory $\phi$ then respectively contain trajectory values $M_{T,k+2}, \ldots, M_{T,k+N}$ and the trajectory values $\phi_{T,k+2}, \ldots, \phi_{T,k+N}$.

Each of the state intermediate value sets $Y_{e,k}, \ldots, Y_{e,k+N}$ mentioned above includes, for example, two stator flux values $\phi_{es1,k}, \ldots, \phi_{es1,k+N}; \phi_{es2,k}, \ldots, \phi_{es2,k+N}$ two rotor flux values $\phi_{eR1,k}, \ldots, \phi_{eR1,k+N}; \phi_{eR2,k}, \ldots, \phi_{eR2,k+N}$ and, possibly, a speed value $V_{e,k}, \ldots, V_{e,k+N}$. In order to calculate the state intermediate value sets $Y_{e,k}, \ldots, Y_{e,k+N}$, the two stator flux values $\phi_{es1,k}, \ldots, \phi_{es1,k+N}; \phi_{es2,k}, \ldots, \phi_{es2,k+N}$, the two rotor flux values $\phi_{eR1,k}, \ldots, \phi_{eR1,k+N}; \phi_{eR2,k}, \ldots, \phi_{eR2,k+N}$ and possibly the speed value $V_{e,k}, \ldots, V_{e,k+N}$ are calculated by means of the digital signal processor from estimated motor parameters, or from motor parameters determined by measurement, with these calculated values then forming the state intermediate value sets $Y_{e,k}, \ldots Y_{e,k+N}$.

The state value sets $X_{e,k}, \ldots X_{e,k+N}$ are then calculated as already mentioned above using a calculation model known to a person skilled in the art, from switching state sequences SSK and from the calculated state intermediate value sets $Y_{e,k}, \ldots, Y_{e,k+N}$ by means of the FPGA, according to step (e2). The calculation of the state value sets $X_{e,k}, \ldots X_{e,k+N}$ is iterative, that is to say, for example, the previous state intermediate value set $Y_{e,k}$ relating to the sampling time k and the switching state sequences SSK for the specific switching state combinations $SK_k$ relating to the sampling time k are used to calculate the state value set $X_{e,k+1}$ relating to the sampling time k+1.

The digital signal processor is accordingly used (e.g., only used) for the calculation steps which are desired for step (e1) of the method, that is to say to calculate the state intermediate value sets $Y_{e,k}, \ldots, Y_{e,k+N}$. The state intermediate value sets $Y_{e,k}, \ldots, Y_{e,k+N}$ calculated in step (e1) are therefore advantageously available after only a very short time and can then be used further by the FPGA directly to calculate the state value sets $X_{e,k}, \ldots, X_{e,k+N}$ and then to calculate the torque trajectory M and the magnetic stator flux trajectory $\phi$.

For example, if a plurality of calculation steps, such as additions, multiplications and the like, are desired to calculate a trajectory value $M_{T,k}, \ldots, M_{T,k+N}$ of the torque trajectory M, then these calculation steps can be advantageously processed in serial form by the FPGA, resulting in a serial calculation sequence (so-called "pipelining"). A trajectory value $\phi_{T,k}, \ldots, \phi_{T,k+N}$ of the magnetic stator flux trajectory $\phi$ is calculated analogously by the FPGA, with the serial calculation sequence for calculating a trajectory value $M_{T,k}, \ldots, M_{T,k+N}$ of the torque trajectory M advantageously being carried out in parallel with the calculation sequence for calculating a trajectory value $\phi_{T,k}, \ldots \phi_{T,k+N}$ of the magnetic stator flux trajectory $\phi$ in the FPGA, thus effectively making it possible to save computation time.

Figure 3:
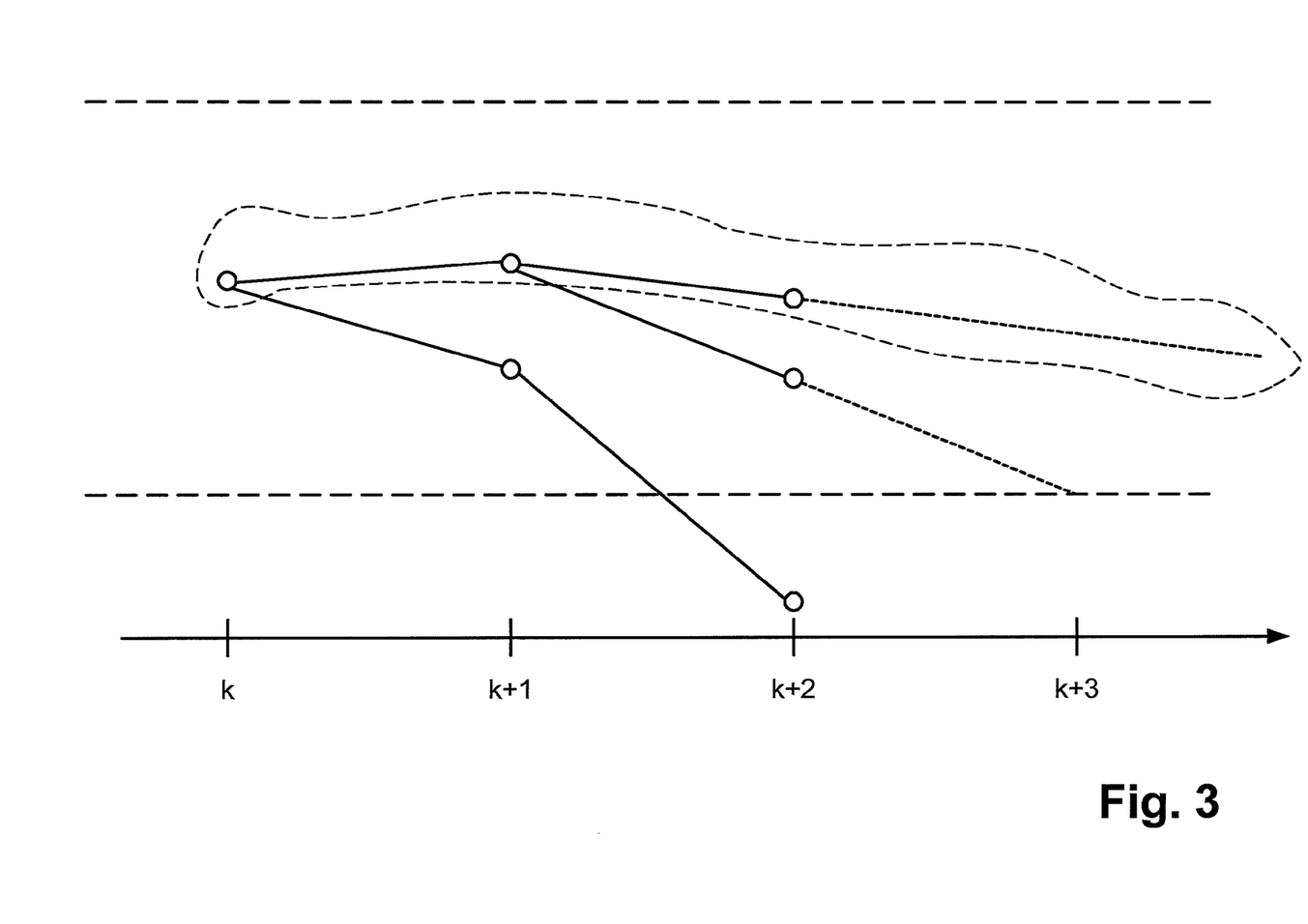
FIG. 3 shows a schematic profile of calculated torque trajectories for N=2 sampling times.

The calculation of the trajectory values $M_{T,k}, \ldots, M_{T,k+N}$; $\phi_{T,k}, \ldots, \phi_{T,k+N}$ as described above can result for each switching state sequence SSK in the torque trajectory M of the rotating electrical machine 1 and a magnetic stator flux trajectory $\phi$ of the rotating electrical machine 1, in which case FIG. 3 shows, by way of example, a schematic profile of such calculated torque trajectories M of associated switching state sequences SSK for N=2 sampling times, and, in this case, the points on the torque trajectories M correspond to the associated determined trajectory values $M_{T,k}, \ldots M_{T,k+N}$. It should be mentioned that, first of all, all the state value sets $X_{e,k}, \ldots, X_{e,k+N}$ for the sampling times k to k+N can also be determined, using the procedure explained above, and the respective trajectory values $M_{T,k}, \ldots, M_{T,k+N}$; $\phi_{T,k} \ldots \phi_{T,k+N}$ for the sampling times k to k+N can then be calculated therefrom in order to form the torque trajectory M and the magnetic stator flux trajectory $\phi$, using the abovementioned process.

In the further step (f1), the switching state combination ($SK_{a,k}$) can be selected in the following exemplary steps (g) to (k) if the torque trajectory (M) relating to the k-th sampling time does not exceed a predetermined upper value range limit ($y_{M,max}$) or does not undershoot a predetermined lower value range limit ($y_{M,min}$), and if the magnetic stator flux trajectory ($\phi$) relating to the k-th sampling time does not exceed a predetermined upper value range limit ($y_{s,max}$) or does not undershoot a predetermined lower value range limit ($y_{s,min}$). Then, in the further step (g), the switching state sequences $SSK_a$ are selected by means of the FPGA for which an associated torque trajectory (M) and a magnetic stator flux trajectory ($\phi$) relating to the (k+N)-th sampling time are each within a predetermined value range. The value range relating to the torque trajectory M can be determined by a predetermined upper value range limit $y_{M,max}$ and a predetermined lower value range limit $y_{M,min}$. The value range for the stator flux trajectory $\phi$ is determined by a predetermined upper value range limit $y_{s,max}$ and a predetermined lower value range limit $y_{s,min}$.

With respect to the torque trajectories M shown in FIG. 3, this would relate to the upper two torque trajectories M, but not to the lower torque trajectory M, with the predetermined value range being indicated in FIG. 3 by two dashed horizontal lines. It should be mentioned that the respectively predetermined value range is time-variant and can be determined in a known manner by a superordinate control loop from reference values of the torque of the rotating electrical machine 1 and of the magnetic stator flux of the rotating electrical machine 1, with such control loops being known by those skilled in the art. A control loop such as this is, for example, provided on the digital signal processor, that is to say the value range is produced by the digital signal processor. Alternatively, the switching state sequences $SSK_a$ are then selected for which the trajectory values $M_{T,k}, \ldots, M_{T,k+N}$ of an associated torque trajectory M and the trajectory values $\phi_{T,k}, \ldots, \phi_{T,k+N}$ of an associated magnetic stator flux trajectory $\phi$ approach the respective predetermined value range with respect to the k-th sampling time to the (k+N)-th sampling time.

Then, in step (h), for each of the selected switching state sequences $SSK_a$, the number of times n is determined by means of the FPGA until the extrapolation of the trajectory values $M_{T,k+N-1}, M_{T,k+N}$ of the associated torque trajectory M or of the trajectory values $\phi_{T,k+N-1}, \phi_{T,k+N}$ of the magnetic stator flux trajectory $\phi$ is outside the respective predetermined value range with respect to the (k+N-1)-th sampling time and the (k+N)-th sampling time, that is to say until one of the extrapolations is the first to leave the respective predetermined value range or intersects the limits of the respective predetermined value range. The determination process by the FPGA mentioned above can be likewise advantageously carried out in serial form (so-called "pipelining"). FIG. 3 shows the respective extrapolation for the two upper relevant torque trajectories M by dashed lines, in which case the extrapolation of the one upper relevant torque trajectory M, as shown in FIG. 3, actually leaves the predetermined value range at k+3, but the extrapolation of the other upper relevant torque trajectory M, which is bounded by dashed lines in order to identify it better, is still within the predetermined value range at k+3.

Furthermore, in step (i), for each of the selected switching state sequences $SSK_a$, the total number of switching transitions s of the associated specific switching state combinations $SK_k, \ldots, SK_{k+N}$ is determined by means of the FPGA. This determination process by the FPGA can, for example, be carried out in serial form (so-called "pipelining").

Furthermore, in step (j), for each of the selected switching state sequences $SSK_a$, a quality value c can be calculated from the number of times n and the total number of switching transitions s by means of the FPGA. The quality value c is, for example, calculated by division of the total number of switching transitions s by the number of times n. This calculation can be advantageously carried out in serial form by the FPGA (so-called "pipelining").

In a further step (k), that specific switching state combination $SK_k$ which relates to the start sampling time k can then be set as the selected switching state combination $SK_{a,k}$ by means of the FPGA for which the quality value c of the associated selected switching state sequence $SSK_a$ is the least. The setting process mentioned above by the FPGA can be carried out in serial form (so-called "pipelining").

In the further step (l), if, instead of step (f1), the torque trajectory M relating to the k-th sampling time exceeds a predetermined upper value range limit $y_{M,max}$ or undershoots a predetermined lower value range limit $y_{M,min}$, the FPGA calculates a torque infringement value $v_{M,k}, \ldots, v_{M,k+N}$, which is related to the upper and lower value range limits $y_{M,min}, y_{M,max}$, for the sampling time k to the sampling time k+N. If the magnetic stator flux trajectory $\phi$ relating to the k-th sampling time exceeds a predetermined upper value range limit $y_{s,max}$ or undershoots a predetermined lower value range limit $y_{s,min}$, the FPGA calculates stator flux infringement value $v_{s,k}, \ldots, v_{s,k+N}$, related to the upper and lower value range limits $y_{s,min}, \ldots, y_{s,max}$, for the sampling time k to the sampling time K+N. In step (m), the FPGA then calculates the maximum value $v_{max}$ from the torque infringement values $v_{M,k}, \ldots, v_{M,k+N}$ and the stator flux infringement values $v_{s,k}, \ldots, v_{s,k+N}$ for each switching state sequence SSK and for the sampling time k to the sampling time K+N. Then, in step (n), the sum $s_{vmax}$ is formed from the maximum values $v_{max}$ for each switching state sequence SSK. Then, in a further step (o), that specific switching state combination $SK_k$ relating to the start sampling time k as the selected switching state combination $SK_{a,k}$ is set by means of the FPGA, for which the sum $S_{vmax}$ of the maximum values $v_{max}$ is the least.

As an alternative to steps (m) to (o), the switching state combination can also be selected using the following exemplary steps:

(m) for each switching state sequence (SSK) and for the sampling time k to the sampling time k+N, determination of the maximum value $(v_{max})$ from the torque infringement values $(v_{M,k}, \ldots, v_{m,k+N})$ and the stator flux infringement values $(v_{s,k}, \ldots, v_{s,k+N})$ by means of the FPGA, (n) for each switching state sequence (SSK) formation of the sum $(s_{vmax})$ of the maximum values $(v_{max})$ by means of the FPGA, (o) setting of that specific switching state combination $(SK_k)$ relating to the start sampling time k as the selected switching state combination $(SK_{a,k})$ by means of the FPGA for which the sum $(S_{vmax})$ of the maximum values $(v_{max})$ is the least.

In step (p), steps (a) to (o) can be repeated, with k=k+1, that is to say the switching state combination $SK_{a,k}$ for k=k+1 is selected using the procedure described above, based on the steps (a) to (k). N is constant for each of the steps (a) to (l).

The use of the FPGA for the method steps (d), that is to say for the method steps (b) and (c), and for the method steps (f) to (k) means that the digital signal processor which is used, which is used for the method step (e1), is used (e.g., only used) for the calculation steps which are desired for step (e1) of the method, as a result of which step (e1) can involve a short computation time. The state intermediate value sets $Y_{e,k}, \ldots, Y_{e,k+N}$ calculated in step (e1) can therefore be available after only a very short time and could then be used further by the FPGA directly, for example, for the method steps (d), that is to say for the method steps (b) and (c), and for the method steps (e2) to (k), with the FPGA likewise processing these method steps in a very short time, for example by its capability for parallel calculation of serial calculation sequences. The determination process according to steps (h) to (k) can be carried out in serial form by the FPGA.

Overall, use of the FPGA in conjunction with the digital signal processor can make it possible to keep the computation time short for the calculation steps of the method and therefore the execution time of the method steps, as a result of which the phases u, v, w of the converter circuit 2 are always connected in good time to the DC voltage circuit 3 according to the selected switching state combination $SK_{a,k}$ of switching states of the power semiconductor switches.

Furthermore, via steps (b) to (k), and for example by extrapolation, it is possible to predict the further behavior of the overall system, that is to say of the rotating electrical machine 1 and of the converter circuit 2 connected to it and subsequently to select an optimum switching state combination $SK_{a,k}$ on the basis of the previous selected switching state combination $SK_{a,k-1}$ and with respect to the number of transitions from the previous selected switching state combination $SK_{a,k-1}$ to the selected switching state combination $SK_{a,k}$ and with respect to the respective predetermined value range for the torque of the rotating electrical machine 1 and for the magnetic stator flux of the rotating electrical machine 1. This can make it possible to reduce the number of switching operations of the power semiconductor switches in the converter circuit 2, and thus to reduce the switching frequency of the power semiconductor switches. Because of the reduced switching frequency, the power semiconductor switches can generate less heat loss and therefore consume less energy, as a result of which the power semiconductor switches therefore age more slowly, and can be very largely protected against damage or destruction.

For the situation in which the respectively associated torque trajectory M or the magnetic stator flux trajectory φ is outside the predetermined value range, the optimum switching state combination $SK_{a,k}$ can be selected via steps (l) to (o). Exemplary methods according to the disclosure are therefore able to handle switching state combinations with a respectively associated torque trajectory M and magnetic stator flux trajectory φ which are outside the predetermined value range. This can allow unrestricted operation of the rotating electrical machine 1.

FIG. 1 illustrates a converter circuit 2 for switching m=3 voltage levels, with the DC voltage circuit 3 then having m−2 sub-connections NP, that is to say a single sub-connection NP. For the case of a converter circuit 2 for switching m voltage levels where m≧3, the converter circuit 2 then has m−2 sub-connections NP on the DC voltage circuit 3. With respect to step (f) of the method according to the disclosure, this means that m−2 potential trajectories $U_{NP}$ are additionally calculated for each of the switching state sequences SSK, for potentials at the m−2 sub-connections NP from state value sets $X_{e,k}, \ldots, X_{e,k+N}$ of the rotating electrical machine 1 and of the converter circuit 2 for the start sampling time k to the sampling time k+N, by means of the FPGA. The calculation referred to is carried out analogously to the already explained calculation of the corresponding torque trajectory M of the rotating electrical machine 1 and the magnetic stator flux trajectory φ of the rotating electrical machine 1.

Furthermore, when m≧3 with respect to step (g), the switching state sequences $SSK_a$ are selected by means of the FPGA for which, in addition, associated m−2 potential trajectories $U_{NP}$ relating to the (k+N)-th sampling time are each within a predetermined value range, or for which, in addition, the trajectory values $U_{NP,k}, \ldots, U_{NP,k+N}$ of associated m−2 potential trajectories $U_{NP}$ approach the respective predetermined value range with respect to the k-th sampling time to the (k+N)-th sampling time. With respect to the potential trajectories $U_{NP}$, the value range is defined by a predetermined upper value range limit $y_{NP,max}$ and a predetermined lower value range limit $y_{NP,min}$.

Furthermore, for m≧3 with respect to step (h), for each of the selected switching state sequences SSK, the FPGA determines the number of times n before the extrapolation of the trajectory values $M_{T,k+N-1}$, $M_{T,k+N}$ of the associated torque trajectory M or of the trajectory values $\phi_{T,k+N-1}, \ldots, \phi_{t,k+N}$ of the magnetic stator flux trajectory φ or of the trajectory values $U_{NP,k+N-1}$, $U_{NP,k+N}$ of the m−2 potential trajectories $U_{NP}$ with respect to the (k+N−1)-th sampling time and the (k+N)-th sampling time is outside the respective predetermined value range. It is self-evident that the steps (a) to (e2) and (i) to (k) are still carried out for m≧3.

For m≧3, it is now possible by means of the steps (b) to (k) and for example by the extrapolation to predict the further behavior of the overall system, that is to say of the rotating electrical machine 1 and of the converter circuit 2 connected to it, and subsequently to select an optimum switching state combination $SK_{a,k}$ on the basis of the previous selected switching state combination $SK_{a,k-1}$ and with respect to the number of transitions from the previous selected switching state combination $SK_{a,k-1}$ to the selected switching state combination $SK_{a,k}$ and with respect to the respective previous value range for the torque of the rotating electrical machine 1, for the magnetic stator flux of the rotating electrical machine 1, and for the m−2 potential at the m−2 sub-connections NP. As already mentioned, this makes it possible to reduce the number of switching operations of the power semiconductor switches in the converter circuit 2, and thus to reduce the switching frequency of the power semiconductor switches.

In a further step (q), steps (b) and (c) are left and a switching state sequence SSK is formed for the previous selected switching state combination $SK_{a,k-1}$ by means of the FPGA, in which case the switching state sequence SSK is then a sequence of N previous selected switching state combinations $SK_{a,k-1}$ and, furthermore, the previous selected switching state combination $SK_{a,k-1}$ is set as the selected switching state combination $SK_{a,k}$ by means of the FPGA and, finally, step (f) is carried out and steps (f1) to (o) are left, if the trajectory values $M_{T,k}, \ldots, M_{T,k+N}$ of the associated torque trajectory M and the trajectory values $\phi_{T,k}, \ldots, \phi_{T,k+N}$ of the associated magnetic stator flux trajectory $\phi$ with respect to the k-th sampling time to the (k+N)-th sampling time are within the respective predetermined value range.

For m≧3, in the further step (q), the steps (b) and (c) are left and a switching state sequence SSK is formed for the previous selected switching state combination $SK_{a,k-1}$ by means of the FPGA, in which case the switching state sequence SSK is then a sequence of N previous selected switching state combinations $SK_{a,k-1}$ and, furthermore, the previous selected switching state combination $SK_{a,k-1}$ is set as the selected switching state combination $SK_{a,k}$ by means of the FPGA and, finally, step (f) is applied and steps (f1) to (o) are left, if the trajectory values $M_{T,k}, \ldots, M_{T,k+N}$ of the associated torque trajectory M, the trajectory values $\phi_{T,k}, \ldots, \phi_{T,k+N}$ of the associated magnetic stator flux trajectory $\phi$ and the trajectory values $U_{NP,k}, \ldots, U_{NP,k+N}$ of the associated m−2 potential trajectories $U_{NP}$ with respect to the k-th sampling time to the (k+N)-th sampling time are within the respective predetermined value range. This saves computation time, since steps (b) and (c) and steps (f) to (o) are left. It is self-evident that the steps (b) to (o) are then used and the further step (q) is not used if the criterion mentioned above are not satisfied for the trajectory values $M_{T,k}, \ldots, M_{T,k+N}; \phi_{t,k}, \ldots, \phi_{T,k+N}; U_{NP,k}, \ldots, U_{NP,k+N}$.

In exemplary embodiments, a linear extrapolation can be selected for the extrapolation of the trajectory values $M_{T,k+N-1}, M_{T,k+N}$ of the torque trajectory M, and a quadratic extrapolation can be selected for the extrapolation of the trajectory values $\phi_{T,k+N-1}, \phi_{T,k+N}$ of the magnetic stator flux trajectory $\phi$. In this case, the selection of a quadratic extrapolation for the magnetic stator flux trajectory $\phi$ in combination with the selection of a linear extrapolation for the torque trajectory M allows the behavior of the overall system to be predicted particularly accurately, thus allowing the selection of the switching state combination $SK_{a,k}$ to be made more precise, resulting in a further reduction in the switching frequency of the power semiconductor switches. Alternatively, for m≧3, a linear extrapolation can in each case be selected for the extrapolation of the trajectory values $M_{T,k+N-1}, M_{T,k+N}$ of the torque trajectory M and of the trajectory values $U_{NP,k+N-1}, U_{NP,k+N}$ of the m−2 potential trajectories $U_{NP}$, and a quadratic extrapolation can be selected for the extrapolation of the trajectory values $\phi_{T,k+N-1}, \phi_{T,k+N}$ of the magnetic stator flux trajectory $\phi$, resulting in exemplary advantages that have been mentioned.

It is also feasible to select a linear extrapolation in each case for the extrapolation of the trajectory values $M_{T,k+N-1}, M_{T,k+N}$ of the torque trajectory M and of the trajectory values $\phi_{T,k+N-1}, \phi_{T,k+N}$ of the magnetic stator flux trajectory $\phi$, where, for m≧3, a linear extrapolation is in each case selected for the extrapolation of the trajectory values $M_{T,k+N-1}, M_{T,k+N}$ of the torque trajectory M, of the trajectory values $\phi_{T,k+N-1}, \phi_{T,k+N}$ of the magnetic stator flux trajectory $\phi$ and, in addition, for the extrapolation of the trajectory values $U_{NP,k+N-1}, U_{NP,k+N}$ of the m−2 potential trajectories $U_{NP}$.

A further possibility is to select a quadratic extrapolation in each case for the extrapolation of the trajectory values $M_{T,k+N-1}, M_{T,k+N}$ of the torque trajectory M and of the trajectory values $\phi_{T,k+N-1}, \phi_{T,k+N}$ of the magnetic stator flux trajectory $\phi$ where, for m≧3, a quadratic extrapolation is in each case selected for the extrapolation of the trajectory values $M_{T,k+N-1}, M_{T,k+N}$ of the torque trajectory M and of the trajectory values $\phi_{T,k+N-1}, \phi_{T,k+N}$ of the magnetic stator flux trajectory $\phi$ and, in addition, a linear extrapolation is selected for the extrapolation of the trajectory values $U_{NP,k+N-1}, U_{NP,k+N}$ of the m−2 potential trajectories $U_{NP}$.

As already mentioned, for a converter circuit 2 for switching m voltage levels where m≧3, the converter circuit 2 has m−2 sub-connections NP to the DC voltage circuit 3. With respect to step (f) of an exemplary method according to the disclosure, this means that m−2 potential trajectories $U_{NP}$ are additionally calculated for each of the switching state sequences SSK, for potentials at the m−2 sub-connections NP, by means of the FPGA.

Furthermore, with respect to step (l), if the m−2 potential trajectories $U_{NP}$ relating to the k-th sampling time then may exceed a predetermined upper value range limit $y_{NP,max}$ or undershoot a predetermined lower value range limit $y_{NP,min}$ a potential infringement value $v_{NP,k}, \ldots, v_{NP,k+N}$ which is related to the upper and lower value range limits $y_{NP,min}, y_{NP,max}$ is calculated by means of the FPGA for the sampling time k to the sampling time K+N for each potential trajectory $U_{NP}$ and, with respect to step (m), the maximum value $v_{max}$ is additionally determined from the potential infringement values $v_{NP,k}, \ldots, v_{NP+k+N}$, by means of the FPGA, for each switching state sequence SSK and for the sampling time k to the sampling time K+N.

As an alternative to this, for m≧3 with respect to step (m), the sum $S_{NP,v}$ of the potential infringement values $v_{NP,k}, \ldots, v_{NP,k+N}$ is additionally formed for each switching state sequence SSK and for the sampling time k to the sampling time K+N and, with respect to step (n), the maximum value $v_{max}$ of the sum $S_{NP,v}$ of the potential infringement values $v_{NP,k} \ldots, v_{NP,k+N}$ is then formed for each switching state sequence SSK.

The calculation of the torque infringement values $v_{M,k}, \ldots, v_{M,k+N}$ of the stator flux infringement values $v_{s,k}, \ldots, v_{s,k+N}$ and of the potential infringement values $v_{NP,k}, \ldots, v_{NP,k+N}$ will be described in more detail in the following text. If the torque trajectory M relating to the k-th sampling time exceeds the predetermined upper value range limit $y_{M,max}$ the torque infringement value $v_{M,k}, \ldots, v_{M,k+N}$, which is related to the upper and lower value range limits $y_{M,min}, y_{M,max}$, for the sampling time k to the sampling time K+N is calculated using the following formula:

$$v_{M,k}, \ldots, v_{M,k+N} = \frac{M_{T,k}, \ldots, M_{T,k+N} - y_{M,max}}{y_{M,max} - y_{M,min}}.$$

If the torque trajectory M relating to the k-th sampling time in contrast undershoots the predetermined lower value range limit $y_{M,min}$, then the torque infringement value $v_{M,k}, \ldots, v_{M,k+N}$, which is related to the upper and lower value range limits $y_{M,min}, y_{M,max}$, for the sampling time k to the sampling time K+N is calculated using the following formula:

$$v_{M,k}, \ldots, v_{M,k+N} = \frac{y_{M,min} - M_{T,k}, \ldots, M_{T,k+N}}{y_{M,max} - y_{M,min}}.$$

$M_{T,k}, \ldots, M_{T,k+N}$ are in this case the trajectory values of the torque trajectory M for the sampling time k to the sampling time K+N.

If the magnetic stator flux trajectory φ relating to the k-th sampling time exceeds the predetermined upper value range limit $y_{s,max}$, then the stator flux infringement value $v_{s,k}, \ldots, v_{s,k+N}$, which is related to the upper and lower value range limits $y_{s,min}, y_{s,max}$, for the sampling time k to the sampling time K+N is calculated using the following formula:

$$v_{S,k}, \ldots, v_{S,k+N} = \frac{\Phi_{T,k}, \ldots, \Phi_{T,k+N} - y_{S,max}}{y_{S,max} - y_{S,min}}.$$

If the magnetic stator flux trajectory φ relating to the k-th sampling time in contrast undershoots the predetermined lower value range limit $y_{s,min}$, then the stator flux infringement value $v_{s,k}, \ldots, v_{s,k+N}$, which is related to the upper and lower value range limits $y_{s,min}, y_{s,max}$, for the sampling time k to the sampling time K+N is calculated using the following formula:

$$v_{S,k}, \ldots, v_{S,k+N} = \frac{y_{S,min} - \Phi_{T,k}, \ldots, \Phi_{T,k+N}}{y_{S,max} - y_{S,min}},$$

$\phi_{T,k}, \ldots, \phi_{T,K+N}$ are in this case the trajectory values of the magnetic stator flux trajectory φ for the sampling time k to the sampling time K+N.

If the m−2 potential trajectories $U_{NP}$ relating to the k-th sampling time exceed the predetermined upper value range limit $y_{NP,max}$ the potential infringement value $v_{NP,k}, \ldots, v_{NP,K+N}$, which is related to the upper and lower value range limits $y_{NP,min}, y_{NP,max}$, for the sampling time k to the sampling time K+N is calculated using the following formula:

$$v_{NP,k}, \ldots, v_{NP,k+N} = \frac{U_{T,k}, \ldots, U_{T,k+N} - y_{NP,max}}{y_{NP,max} - y_{NP,min}}.$$

If the m−2 potential trajectories $U_{NP}$ relating to the k-th sampling time in contrast undershoot the predetermined lower value range limit $y_{NP,min}$, then the potential infringement value $v_{NP,k}, \ldots, v_{NP,K+N}$, which is related to the upper and lower value range limits $y_{NP,min}, y_{NP,max}$, for the sampling time k to the sampling time K+N is calculated using the following formula:

$$v_{NP,k}, \ldots, v_{NP,k+N} = \frac{y_{NP,min} - U_{T,k}, \ldots, U_{T,k+N}}{y_{NP,max} - y_{NP,min}},$$

where $U_{T,k}, \ldots, U_{T,K+N}$ are the trajectory values of the m−2 potential trajectories $U_{NP}$ for the sampling time k to the sampling time K+N.

For the sake of completeness, it should be mentioned that if, in an exemplary case, the respective trajectory relating to the k-th sampling time is within the band formed by the associated upper and lower value range limits, the associated infringement value relating to the sampling time k to the sampling time K+N is set to zero.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF REFERENCE SYMBOLS

1 Rotating electrical machine
2 Converter circuit for switching three voltage levels
3 DC voltage circuit
4 Sub-converter system
5 First switching group
6 Second switching group
7 Third switching group

What is claimed is:

1. A method for operating a rotating electrical machine, wherein the rotating electrical machine is connected phase-by-phase to a converter circuit, which has a DC voltage circuit, for switching m voltage levels, where m≧2, the method comprising:

(a) connecting phases (u, v, w) of the converter circuit to the DC voltage circuit in accordance with a selected switching state combination ($SK_{a,k}$) of switching states of power semiconductor switches in the converter circuit;

(b) starting with a start sampling time k for a selectable number N of sampling times: determining permissible switching state combinations ($SK_k, \ldots SK_{k+N}$) relating to each of the N sampling times, wherein N≧1;

(c) forming switching state sequences (SSK) for each specific switching state combination ($SK_k$) relating to the start sampling time k, wherein each switching state sequence (SSK) is a sequence of specific switching state combinations ($SK_k, \ldots SK_{k+N}$) of the N sampling times associated with the respective switching state combination ($SK_k$) relating to the start sampling time k, wherein the switching state combination ($SK_{a,k}$) is selected as follows:

(d) performing the determining of (b) and the forming of (c) using a field programmable gate array (FPGA);

(e1) calculating state intermediate value sets ($Y_{e,k}, \ldots, Y_{e,k+N}$) of the rotating electrical machine and the converter circuit for the start sampling time k to the sampling time k+N using a digital signal processor;

(e2) calculating state value sets ($X_{e,k}, \ldots X_{e,k+N}$) from switching state sequences (SSK) and from the calculated state intermediate value sets ($Y_{e,k}, \ldots, Y_{e,k+N}$) using the FPGA;

(f) for each of the switching state sequences (SSK), calculating a torque trajectory (M) of the rotating electrical machine and of a magnetic stator flux trajectory (φ) of the rotating electrical machine using the FPGA from the calculated state value sets ($X_{e,k}, \ldots, X_{e,k+N}$) for the start sampling time k to the sampling time k+N;

(f1) if the torque trajectory (M) relating to the k-th sampling time does not exceed a predetermined upper value range limit ($y_{M,max}$) or does not undershoot a predetermined lower value range limit ($y_{M,min}$), and if the magnetic stator flux trajectory (φ) relating to the k-th sampling time does not exceed a predetermined upper value range limit ($y_{s,max}$) or does not undershoot a predetermined lower value range limit ($y_{s,min}$), selecting the switching state combination ($SK_{a,k}$) as follows in (g) to (k):

(g) selecting the switching state sequences ($SSK_a$) using the FPGA for which an associated torque trajectory (M) and a magnetic stator flux trajectory ($\phi$) relating to the (k+N)-th sampling time are each within a predetermined value range, or for which the trajectory values ($M_{T,k}, \ldots, M_{T,k+N}$) of an associated torque trajectory (M) and the trajectory values ($\phi_{T,k}, \ldots \phi_{T,k+N}$) of an associated magnetic stator flux trajectory ($\phi$) approach the respective predetermined value range with respect to the k-th sampling time to the (k+N)-th sampling time;

(h) for each of the selected switching state sequences ($SSK_a$), determining a number of times n using the FPGA until extrapolation of the trajectory values ($M_{T,k+N-1}, M_{T,k+N}$) of the associated torque trajectory (M) or of the trajectory values ($\phi_{T,k+N-1}, \phi_{T,k+N}$) of the magnetic stator flux trajectory ($\phi$) is outside the respective predetermined value range with respect to the (k+N-1)-th sampling time and the (k+N)-th sampling time;

(i) for each of the selected switching state sequences ($SSK_a$), determining a total number of switching transitions s of associated specific switching state combinations ($SK_k, \ldots, SK_{k+N}$) using the FPGA;

(j) for each of the selected switching state sequences ($SSK_a$), calculating a quality value c from a number of times n and a total number of switching transitions s using the FPGA;

(k) setting of a specific switching state combination ($SK_k$) with respect to the start sampling time k as the selected switching state combination ($SK_{a,k}$) using the FPGA, for which the quality value c of the associated selected switching state sequence ($SSK_a$) is the least;

(l) if the torque trajectory (M) relating to the k-th sampling time exceeds a predetermined upper value range limit ($y_{M,max}$) or undershoots a predetermined lower value range limit ($y_{M,min}$), calculating a torque infringement value ($v_{M,k}, \ldots, v_{M,k+N}$), which is related to the upper and lower value range limits ($y_{M,min}, y_{M,max}$), using the FPGA for the sampling time k to the sampling time k+N, if the magnetic stator flux trajectory ($\phi$) relating to the k-th sampling time exceeds a predetermined upper value range limit ($y_{s,max}$) or undershoots a predetermined lower value range limit ($y_{s,min}$), calculating a stator flux infringement value ($v_{s,k}, \ldots, v_{s,k+N}$), related to the upper and lower value range limits ($y_{s,min}, \ldots, y_{s,max}$), using the FPGA for the sampling time k to the sampling time k+N, and selecting the switching state combination ($SK_{a,k}$) as follows in (m) to (o):

(m) for each switching state sequence (SSK) and for the sampling time k to the sampling time k+N, determining a maximum value ($v_{max}$) from the torque infringement values ($v_{M,k}, \ldots, v_{M,k+N}$) and the stator flux infringement values ($v_{s,k}, \ldots, v_{s,k+N}$) using the FPGA;

(n) for each switching state sequence (SSK) forming a sum ($s_{vmax}$) of the maximum values ($v_{max}$) using the FPGA;

(o) setting of a specific switching state combination ($SK_k$) relating to the start sampling time k as the selected switching state combination ($SK_{a,k}$) using the FPGA for which the sum ($S_{vmax}$) of the maximum values ($v_{max}$) is the least; and (p) repeating (a) to (o), where k=k+1.

2. The method as claimed in claim 1, wherein, for m≧3, the converter circuit has m−2 sub-connections (NP) for switching m voltage levels on the DC voltage circuit, the method comprising:

in (f), for each of the switching state sequences (SSK), calculating m−2 potential trajectories ($U_{NP}$) for potentials at the m−2 sub-connections (NP) using the FPGA;

in (g), selecting the switching state sequences ($SSK_a$) using the FPGA for which, additionally, associated m−2 potential trajectories ($U_{NP}$) relating to the (k+N)-th sampling time are each within a predetermined value range, or for which, additionally, the trajectory values ($U_{NP,k}, \ldots, U_{NP,k+N}$) of associated m−2 potential trajectories ($U_{NP}$) with respect to the k-th sampling time to the (k+N)-th sampling time approach the respective predetermined value range;

in (h), for each of the selected switching state sequences ($SSK_a$), determining a number of times n using the FPGA until extrapolation of the trajectory values ($M_{T,k+N-1}, M_{T,k+N}$) of the associated torque trajectory (M) or of the trajectory values ($\phi_{T,k+N-1}, \phi_{T,k+N}$) of the magnetic stator flux trajectory ($\phi$) or of the trajectory values ($U_{NP,k+N-1}, U_{NP,k+N}$) of the m−2 potential trajectories ($U_{NP}$) with respect to the (k+N−1)-th sampling time and the (k+N)-th sampling time is outside the respective predetermined value range.

3. The method as claimed in claim 1, comprising:

(q) leaving step (b) and step (c) and forming a switching state sequence (SSK) for a previous selected switching state combination ($SK_{a,k-1}$) using the FPGA, wherein the switching state sequence (SSK) is a sequence of N previous selected switching state combinations ($SK_{a,k-1}$), and setting of the previous selected switching state combination ($SK_{a,k-1}$) as the selected switching state combination ($SK_{a,k}$) using the FPGA and step (f), and leaving steps (f1) to (o) if the trajectory values ($M_{T,k}, \ldots, M_{T,k+N}$) of the associated torque trajectory (M) and the trajectory values ($\phi_{T,k}, \ldots, \phi_{T,k+1}$) of the associated magnetic stator flux trajectory ($\phi$) with respect to the k-th sampling time to the (k+N)-th sampling time is within the respective predetermined value range.

4. The method as claimed in claim 2, comprising:

(q) leaving step (b) and step (c), and forming a switching state sequence (SSK) for a previous selected switching state combination ($SK_{a,k-1}$) using the FPGA, wherein the switching state sequence (SSK) is a sequence of N previous selected switching state combinations ($SK_{a,k-1}$), and setting of the previous selected switching state combination ($SK_{a,k-1}$) as the selected switching state combination ($SK_{a,k}$) using the FPGA and step (f), and leaving steps (f1) to (o) if the trajectory values ($M_{T,k}, \ldots, M_{T,k+N}$) of the associated torque trajectory (M), the trajectory values ($\phi_{T,k}, \ldots, \phi_{T,k+N}$) of the associated magnetic stator flux trajectory ($\phi$) and the trajectory values ($U_{NP,k}, \ldots, U_{NP,k+N}$) of associated m−2 potential trajectories ($U_{NP}$) with respect to the k-th sampling time to the (k+N)-th sampling time is within the respective predetermined value range.

5. The method as claimed in claim 1, comprising:

selecting a linear extrapolation for each extrapolation of the trajectory values ($M_{T,k+N-1}, \ldots M_{T,k+N}$) of the torque trajectory (M) and of the trajectory values ($\phi_{T,k+N-1}, \phi_{T,k+N}$) of the magnetic stator flux trajectory ($\phi$).

6. The method as claimed in claim 2, comprising:

selecting a linear extrapolation for each extrapolation of the trajectory values ($M_{T,k+N-1}, M_{T,k+N}$) of the torque trajectory (M), of the trajectory values ($\phi_{T,k+N-1}$, $\phi_{T,k+N}$) of the magnetic stator flux trajectory ($\phi$) and of the trajectory values ($U_{NP,k+N-1}$, $U_{NP,k+N}$) of the m−2 potential trajectories ($U_{NP}$).

7. The method as claimed in claim 1, comprising:
selecting a quadratic extrapolation for each extrapolation of the trajectory values ($M_{T,k+N-1}$, ..., $M_{T,k+N}$) of the torque trajectory (M) and of the trajectory values ($\phi_{T,k+N-1}$, $\phi_{T,k+N}$) of the magnetic stator flux trajectory ($\phi$).

8. The method as claimed in claim 2, comprising:
selecting a quadratic extrapolation for each extrapolation of the trajectory values ($M_{T,k+N-1}$, ... $M_{T,k+N}$) of the torque trajectory (M) and of the trajectory values ($\phi_{T,k+N-1}$, $\phi_{T,k+N}$) of the magnetic stator flux trajectory ($\phi$); and
selecting a linear extrapolation for the extrapolation of the trajectory values ($U_{NP,k+N-1}$, $U_{NP,k+N}$) of the m−2 potential trajectories ($U_{NP}$).

9. The method as claimed in claim 1, comprising:
selecting a linear extrapolation for the extrapolation of the trajectory values ($M_{T,k+N-1}$, $M_{T,k+N}$) of the torque trajectory (M); and
selecting a quadratic extrapolation for the extrapolation of the trajectory values ($\phi_{T,k+N-1}$, $\phi_{T,k+N}$) of the magnetic stator flux trajectory ($\phi$).

10. The method as claimed in claim 1, comprising:
selecting a linear extrapolation for each extrapolation of the trajectory values ($M_{T,k+1}$, $\phi_{T,k+N}$) of the torque trajectory (M) and of the trajectory values ($U_{NP,k+N-1}$, $U_{NP,k+N}$) of the m−2 potential trajectories ($U_{NP}$); and
selecting a quadratic extrapolation for the extrapolation of the trajectory values ($\phi_{T,k+N-1}$, $\phi_{T,k+m}$) of the magnetic stator flux trajectory ($\phi$).

11. The method as claimed in claim 1, comprising:
calculating a quality value c by division of the total number of switching transitions s by the number of times n.

12. The method as claimed in claim 1, wherein, for m≧3, the converter circuit for switching m voltage levels at the DC voltage circuit has m−2 sub-connections (NP), the method comprising:
in (f), for each of the switching state sequences (SSK), calculating m−2 potential trajectories ($U_{NP}$) for potentials at the m−2 sub-connections (NP) using the FPGA;
in (l), if the m−2 potential trajectories ($U_{NP}$) relating to the k-th sampling time exceed a predetermined upper value range limit ($y_{NP,max}$) or undershoot a predetermined lower value range limit ($y_{NP,min}$), calculating a potential infringement value ($v_{NP,k}$, ..., $v_{NP,k+N}$), which is related to the upper and lower value range limits ($y_{NP,min}$, $y_{NP,max}$), using the FPGA for the sampling time k to the sampling time K+N for each potential trajectory ($U_{NP}$); and
in (m), for each switching state sequence (SSK) and for the sampling time k to the sampling time K+N, determining the maximum value ($v_{max}$) from the potential infringement values ($v_{NP,k}$, ..., $v_{NP,k+N}$) using the FPGA.

13. The method as claimed in claim 1, comprising:
if the torque trajectory (M) relating to the k-th sampling time exceeds the predetermined upper value range limit ($y_{M,max}$) calculating the torque infringement value ($v_{m,k}$, ..., $v_{m,k+N}$), which is related to the upper and lower value range limits ($y_{M,min}$, $y_{M,max}$), for the sampling time k to the sampling time K+N using a formula:

$$v_{M,k}, \ldots, v_{M,k+N} = \frac{M_{T,k}, \ldots, M_{T,k+N} - y_{M,max}}{y_{M,max} - y_{M,min}},$$

and
if the torque trajectory (M) relating to the k-th sampling time undershoots the predetermined lower value range limit ($y_{M,min}$), calculating the torque infringement value ($v_{M,k}$, ..., $v_{M,k+N}$), which is related to the upper and lower value range limits ($y_{M,min}$, $y_{M,max}$) for the sampling time k to the sampling time K+N using a formula:

$$v_{M,k}, \ldots, v_{M,k+N} = \frac{y_{M,min} - M_{T,k}, \ldots, M_{T,k+N}}{y_{M,max} - y_{M,min}},$$

where $M_{T,k}$, ..., $M_{T,k+N}$ are the trajectory values of the torque trajectory (M) for the sampling time k to the sampling time K+N.

14. The method as claimed in claim 1, comprising:
if the magnetic stator flux trajectory ($\phi$) relating to the k-th sampling time exceeds the predetermined upper value range limit ($y_{s,max}$), the stator flux infringement value ($v_{s,k}$ ... $v_{s,K+N}$), which is related to the upper and lower value range limits ($y_{s,min}$, $y_{s,max}$), for the sampling time k to the sampling time K+N using a formula:

$$v_{S,k}, \ldots, v_{S,k+N} = \frac{\Phi_{T,k}, \ldots, \Phi_{T,k+N} - y_{S,max}}{y_{S,max} - y_{S,min}},$$

and
if the magnetic stator flux trajectory ($\phi$) relating to the k-th sampling time undershoots the predetermined lower value range limit ($y_{s,min}$), calculating the stator flux infringement value ($v_{s,k}$, ..., $v_{s,K+N}$), which is related to the upper and lower value range limits ($y_{s,min}$, $y_{s,max}$), for the sampling time k to the sampling time K+N using a formula:

$$v_{S,k}, \ldots, v_{S,k+N} = \frac{y_{S,min} - \Phi_{T,k}, \ldots, \Phi_{T,k+N}}{y_{S,max} - y_{S,min}},$$

where $\phi_{T,k}$, ..., $\phi_{T,k+N}$ are the trajectory values of the magnetic stator flux trajectory ($\phi$) for the sampling time k to the sampling time K+N.

15. The method as claimed in claim 12, comprising:
if the m−2 potential trajectories ($U_{NP}$) relating to the k-th sampling time exceed the predetermined upper value range limit ($y_{NP,max}$), calculating the potential infringement value ($V_{NP,K}$, ..., $V_{NP,K+N}$), which is related to the upper and lower value range limits ($y_{NP,min}$, $y_{NP,max}$), for the sampling time k to the sampling time K+N using a formula:

$$v_{NP,k}, \ldots, v_{NP,k+N} = \frac{U_{T,k}, \ldots, U_{T,k+N} - y_{NP,max}}{y_{NP,max} - y_{NP,min}},$$

and
if the m−2 potential trajectories ($U_{NP}$) relating to the k-th sampling time undershoot the predetermined lower value range limit ($y_{NP,min}$), calculating the potential infringement value ($v_{NP,k}, \ldots, v_{NP,k+N}$), which relates to the upper and lower value range limits ($y_{NP,min}, y_{NPmax}$) for the sampling time k to the sampling time K+N using a formula:

$$v_{NP,k}, \ldots, v_{NP,k+N} = \frac{y_{NP,min} - U_{T,k}, \ldots, U_{T,k+N}}{y_{NP,max} - y_{NP,min}},$$

where $U_{T,k}, \ldots U_{T,K+N}$ are the trajectory values of the m−2 potential trajectories ($U_{NP}$) for the sampling time k to the sampling time K+N.

16. A method for operating a rotating electrical machine, wherein the rotating electrical machine is connected to a converter circuit, which has a DC voltage circuit, the method comprising:

(a) connecting phases of the converter circuit to the DC voltage circuit in accordance with a selected switching state combination of switching states of power semiconductor switches in the converter circuit; and (b) selecting the switching state combination based on a preceding selected switching state combination, a number of transitions from the preceding selected switching state combination to the selected switching state combination, and a predetermined value range for torque of the rotating electric machine, for magnetic stator flow of the rotating electric machine, and for a potential on the partial connection.

* * * * *